(12) United States Patent
Peace et al.

(10) Patent No.: US 7,558,295 B1
(45) Date of Patent: Jul. 7, 2009

(54) VOICE ACCESS MODEL USING MODEM AND SPEECH COMPRESSION TECHNOLOGIES

(75) Inventors: Jonathan Peace, Rancho Mirage, CA (US); Huan-Yu Su, San Clemente, CA (US); Thomas H. Eichenberg, Modjesua Cyn, CA (US); Oleg Khaykin, Scottsdale, AZ (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 903 days.

(21) Appl. No.: 10/456,596

(22) Filed: Jun. 5, 2003

(51) Int. Cl.
*H04J 3/04* (2006.01)

(52) U.S. Cl. ........................ 370/535; 370/329

(58) Field of Classification Search ................ 370/355, 370/329, 349, 432, 433
See application file for complete search history.

(56) References Cited

U.S. PATENT DOCUMENTS

| | | | | |
|---|---|---|---|---|
| 5,301,190 | A * | 4/1994 | Tsukuda et al. | 370/362 |
| 5,436,899 | A * | 7/1995 | Fujino et al. | 370/433 |
| 5,598,401 | A * | 1/1997 | Blackwell et al. | 370/385 |
| 6,134,232 | A * | 10/2000 | Ashley et al. | 370/349 |
| 6,704,769 | B1 * | 3/2004 | Comstock et al. | 709/204 |
| 6,992,692 | B2 * | 1/2006 | Gu et al. | 348/14.12 |
| 7,139,807 | B2 * | 11/2006 | Comstock et al. | 709/207 |
| 7,221,663 | B2 * | 5/2007 | Rodman et al. | 370/329 |
| 7,308,101 | B2 * | 12/2007 | Wing | 380/257 |
| 2003/0091034 | A1 * | 5/2003 | Koistinen | 370/352 |
| 2003/0224815 | A1 * | 12/2003 | Rodman et al. | 455/517 |
| 2004/0075772 | A1 * | 4/2004 | Gu et al. | 348/571 |
| 2005/0154584 | A1 * | 7/2005 | Jelinek et al. | 704/219 |
| 2005/0223300 | A1 * | 10/2005 | Baartmans et al. | 714/48 |
| 2006/0013321 | A1 * | 1/2006 | Sekiguchi et al. | 375/240.27 |

OTHER PUBLICATIONS

Wang, Sanhai, Su, Sen and Yang, Fangchun, "A Study on Call Model of Soft-Switch," International Conference on Communication Technology Proceedings, 2003 (ICCT 2003), Apr. 9-11, 2003, vol. 2, pp. 1566-1569.*

Gao, Yang et al., "The SMV Algorithm Selected by TIA and 3GPP2 for CDMA Applications," 2001 IEEE International Conference on Acoustics, Speech, and Signal Processing, 2001, Proceedings. (ICASSP '01). May 7-11, 2001, vol. 2, pp. 709-712.*

(Continued)

*Primary Examiner*—Chi H Pham
*Assistant Examiner*—Albert T Chou
(74) *Attorney, Agent, or Firm*—Farjami & Farjami LLP

(57) ABSTRACT

There is provided system and method for receiving speech signals via a plurality of speech lines and communicating the speech signals over a phone line. For example, the communication system comprises a modem, a multiplexor in data communication with the modem, and a plurality of speech codecs in data communication with the multiplexor. According to this aspect, each of the plurality of speech codecs receives a portion of the speech signals via one of the plurality of speech lines and encodes that portion of the speech signals to generate encoded speech signals, and wherein the encoded speech signals from each of the plurality of speech codecs are multiplexed by the multiplexor to generate multiplexed encoded speech signals, and wherein the modem transmits the multiplexed encoded speech signals over the phone line.

19 Claims, 4 Drawing Sheets

OTHER PUBLICATIONS

ITU-T Recommendation V.90,"A Digital Modem and Alalogue Modem Pair for use on the Public Switched Telephone Network (PSTN) at Data Signalling Rates of up to 56 000 bits/s Downstream and up to 33 600 bit/s Upstream," Sep. 1998.*

Jim Davis, *Voice and data share a wire*, CNET News.com (Aug. 16, 2007), at http://news.com.com/Voice+and+data+share+a+wire/2100-1001_3-234180.html.

* cited by examiner

VOICE ACCESS MODEL USING MODEM AND SPEECH COMPRESSION TECHNOLOGIES

BACKGROUND OF THE INVENTION

1. Field of the Invention

The present invention generally relates to voice communication and, more particularly, to systems and methods for voice communication using speech compression and modem technologies.

2. Related Art

Today, various means are employed to access the central office ("CO") for voice communications. For example, residential customers use the standard twisted pair for voice communications through the CO. Also, as shown in FIG. 1, communication system 105, such as those used by commercial entities and large enterprises, use T1/E1 line 110 for voice connectivity to CO 115. As shown, CO 115 routes the voice traffic through T1/E1 line 110 through public switched telephone network ("PSTN") lines 120 for delivery to the ultimate recipients of the voice communications.

A major drawback of T1/E1 line 110 or other broadband media is the tremendous cost associated with such services. For example, today, the service cost for a single T1 line is about $500-$1,200 per month. This price is extremely high when compared to the monthly cost of a twisted pair or an analog telephone line, which is about $10-$15 per month. On the other hand, a twisted pair or an analog telephone line can only support one voice channel, whereas a T1 line is capable of supporting up to 24 voice channels and an E1 line is capable of supporting up to 30 voice channels.

Accordingly, there is an intense need for a new voice access or communication model that can provide a communication bandwidth comparable to T1/E1 lines, but at the cost comparable to that of an analog telephone line.

SUMMARY OF THE INVENTION

In accordance with the purpose of the present invention as broadly described herein, in one aspect of the present invention, there is provided system and method for receiving speech signals via a plurality of speech lines and communicating the speech signals over a phone line. For example, the communication system comprises a modem, a multiplexor in data communication with the modem, and a plurality of speech codecs in data communication with the multiplexor. According to this aspect, each of the plurality of speech codecs receives a portion of the speech signals via one of the plurality of speech lines and encodes that portion of the speech signals to generate encoded speech signals, and wherein the encoded speech signals from each of the plurality of speech codecs are multiplexed by the multiplexor to generate multiplexed encoded speech signals, and wherein the modem transmits the multiplexed encoded speech signals over the phone line.

In another aspect, there is provided system and method for receiving modulated multiplexed encoded speech signals via a phone line for communication over a plurality of speech lines. For example the communication system comprises a modem, a demultiplexor in data communication with the modem, and a plurality of speech codecs in data communication with the demultiplexor. According to this aspect, the modem receives the modulated multiplexed encoded speech signals over the phone line and demodulates the modulated multiplexed encoded speech signals to generate multiplexed encoded speech signals, and wherein the demultiplexor demultiplexes the multiplexed encoded speech signals to generate a plurality of encoded speech signals, and wherein each of the plurality of speech codecs receives one of the plurality of encoded speech signals and decodes the one of the plurality of encoded speech signals to generate a plurality of speech signals for communication over the plurality of speech lines.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF DRAWINGS

The features and advantages of the present invention will become more readily apparent to those ordinarily skilled in the art after reviewing the following detailed description and accompanying drawings, wherein.

DESCRIPTION OF EXEMPLARY EMBODIMENTS

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that are known to those skilled in the art are not described in detail herein. It should be appreciated that the particular implementations shown and described herein are merely exemplary and are not intended to limit the scope of the present invention in any way.

Figure 1:
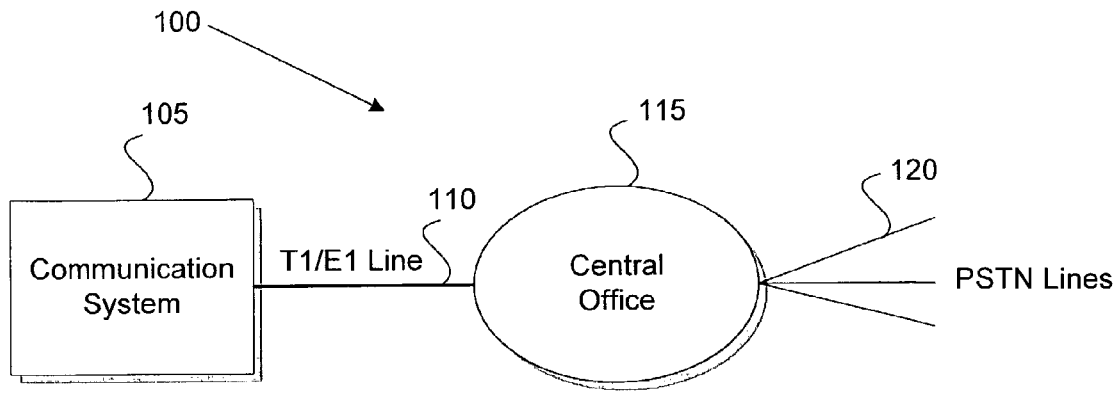
FIG. 1 illustrates a conventional voice communication system or model.
Figure 2:
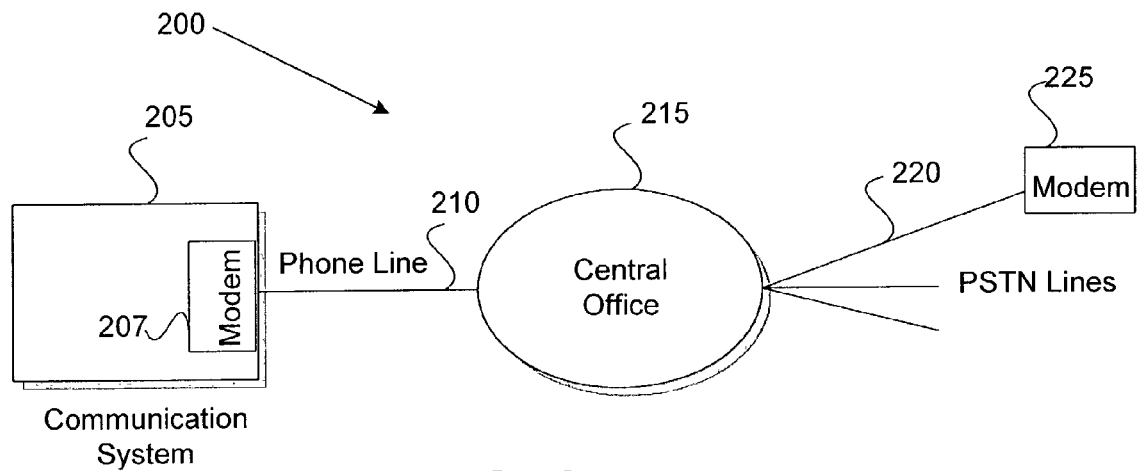
FIG. 2 illustrates a conventional modem communication system or model.

FIG. 2 illustrates conventional modem communication system or model 200 that is typically employed for use by communication system 205 for data communication. As shown, communication system 205 can use modem 207 to call modem 225 via phone line 210. Phone line 210 is routed through central office 215 and PSTN lines 220 to provide a communication link between modem 207 and modem 225. After an initial training, modem 207 and modem 225 are able to establish a communication channel or connection via the communication link through phone line 210, central office 215 and PSTN lines 220. Modem 207 is capable of receiving data from communication system 205, modulating the data to generate modulated data and performing digital-to-analog conversion for transmission of the modulated data as analog signals via a telephone line to modem 225. Modem 225 is also capable of receiving the analog signals, performing analog-to-digital conversion to obtain the modulated data and demodulating the modulated data retrieve the data. Modem 225 may be connected to a network or an Internet Service Provider ("ISP").

Figure 3:
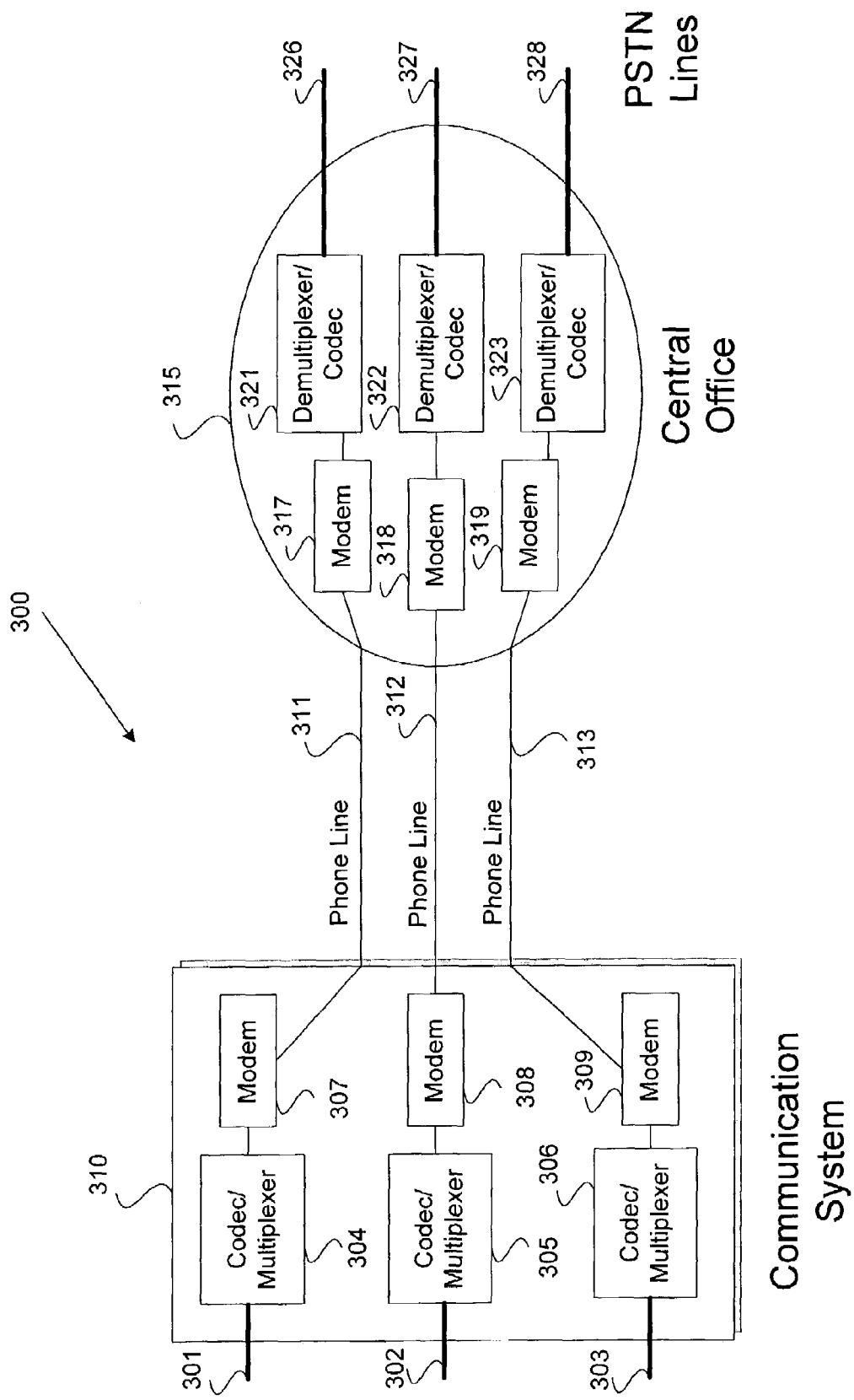
FIG. 3 illustrates a voice access model according to one embodiment of the present invention.

FIG. 3 illustrates voice access model 300 according to one embodiment of the present invention. The exemplary voice access model of FIG. 3 illustrates an alternative to the T1/E1-based communication systems, and provides a voice communication bandwidth, which is comparable T1/E1, but at the low cost of analog voice or phone lines. In the exemplary embodiment of FIG. 3, voice access model 300 uses three phone lines 311, 312 and 313 to provide communication links between communication system 310 and central office 315, rather than using expensive broadband communication lines, such as T1/E1 lines.

As shown, communication system 310 includes a number of modems, such as modem 307, modem 308 and modem 309. Each of modems 307, 308 and 309 is in communication with central office 315 via phone lines 311, 312 and 313, respectively. Further, each of modems 307, 308 and 309 receives data from codec/multiplexor 304, 305 and 306, respectively, and transmits the data over phone lines 311, 312 and 313, respectively. As it is known in the art, each speech codec (coder/decoder) includes an encoder portion for coding speech signal and a decoding portion for decoding coded speech signal. Each of lines 301, 302 and 303 includes a plurality of speech lines.

Figure 4:
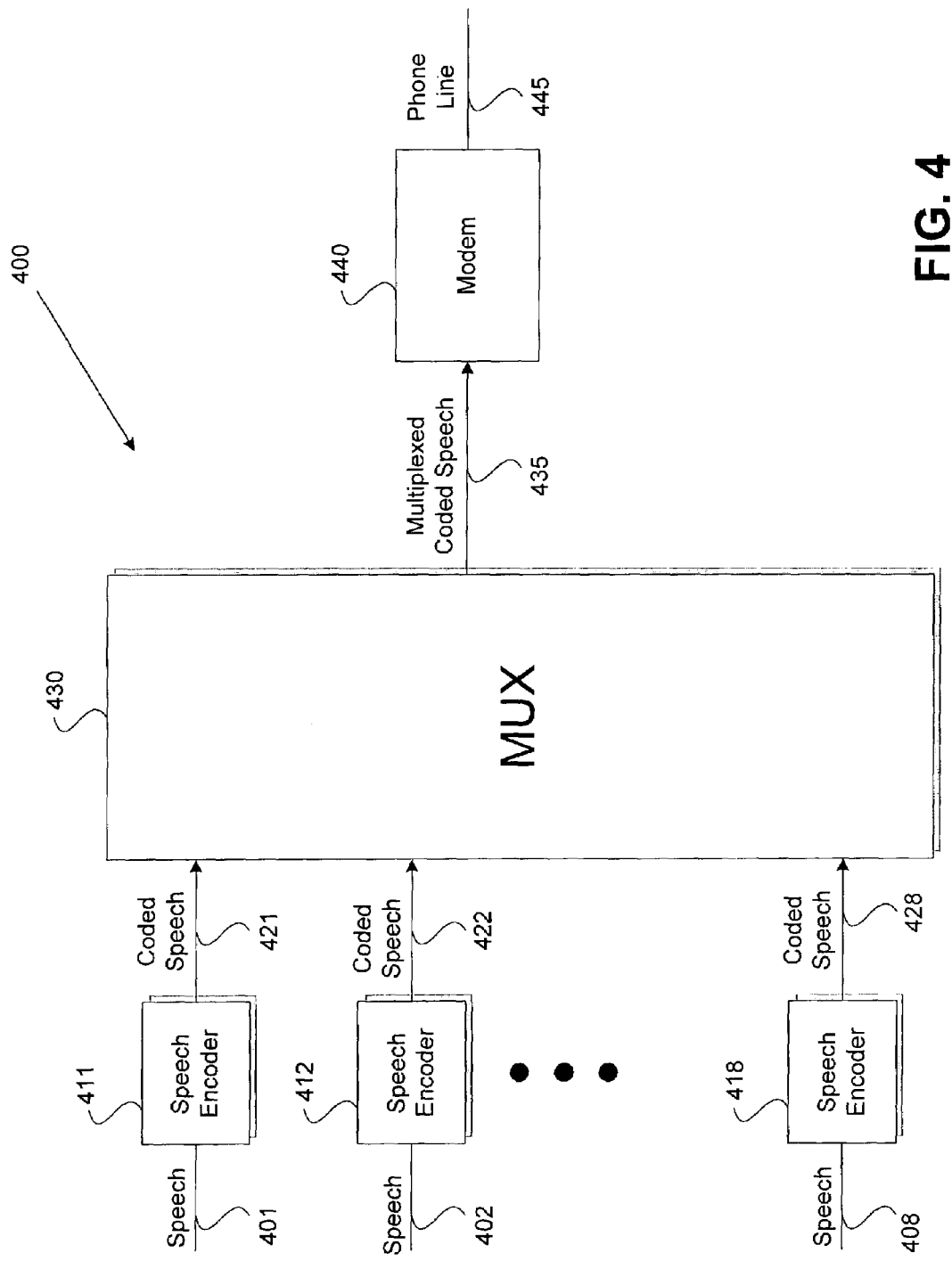
FIG. 4 illustrates a voice transmission model according to one embodiment of the present invention for use in conjunction with the voice access model of FIG. 3.

Referring now to FIG. 4, it illustrates voice transmission model 400 according to one embodiment of the present invention for use in conjunction with voice access model 300 of FIG. 3. It should be noted modem 440 represents each of modems 307, 308 and 309; phone line 445 represents each of phone lines 311, 312 and 313; multiplexor 404 and speech encoders 411-418 represent each of codec/multiplexor 304, 305 and 306; and speech lines 401-408 represent each of lines 301, 302 and 303.

In FIG. 4, exemplary modem 440 is shown to accommodate a plurality of speech lines 401-408 carrying speech signals emanating from a plurality of sources (not shown). Each speech line 401-408 arrives at its respective speech encoder 411-418, where the speech signal is compressed or encoded to generate coded speech 421-428. Speech encoders 411-418 may use a variety of speech coding algorithms for compressing the speech signal. For example, in one embodiment, speech encoders can implement and are in compliance with the Selectable Mode Vocoder ("SMV") standard, entitled "Selectable Vocoder Mode Service Option for Wideband Spread Spectrum Communication Systems", dated December 2001, 3GPP2, Version 2, which is hereby incorporated by reference. In an embodiment utilizing the SMV standard, communication system 300 will also allow dynamic quality adjustments to improve the voice quality. Continuing with FIG. 4, multiplexor 430 receives the plurality of coded speeches 421-428 and generates multiplexed coded speech 435 including a combination of the plurality of coded speeches 421-428. Next, modem 440 performs modulation and digital-to analog conversion on multiplexed coded speech 435 for transmission on phone line 445. Modem 440 may perform modulation/demodulation in accordance with any proprietary scheme or in compliance with a variety of known standards, such as V.92, V.90, V.34, V.32bis, V.32, V.22bis, V.22, etc.

According to the SMV standard, full-rate speech compression requires about 8 kbps of data bandwidth, half-rate speech compression requires about 4 kbps of data bandwidth, and quarter-rate speech compression requires about 2 kbps of data bandwidth. Therefore, if each speech encoder 411-418 performs speech compression at the full-rate, coded speeches 421-428 would each require about 8 kbps of data bandwidth, which results in about 64 kbps of total data bandwidth for multiplexed coded speech 435 that can be accommodated by modem 440. Accordingly, modems 307, 308 and 309 may each provide eight (8) channels of full-rate speech, or twenty-four channels in total, via regular telephone lines. In other words, in one embodiment, the present invention can provide the same number of channels as a T1 line at the cost of three regular phone lines. Yet, in other embodiments, all speech encoder 411-418 may perform speech compression at the half-rate, in which event, coded speeches 421-428 would each require about 4 kbps of data bandwidth, which results in 32 kbps of total data bandwidth for multiplexed coded speech 435. Therefore, in such embodiment, the number of speech lines may be increased from eight (8) to sixteen (16) to accommodate sixteen speech lines per modem, which results in forty-eight speech lines or twice as many speech channels that can be supported by a single T1 line. Of course, speech encoders 411-418 may each run at a different rate, based on various predetermine settings, or dynamically change based on system requirements or speech compression algorithm or protocol, such as SMV. It should be noted that in some embodiments, each speech encoder 411-418 may use a different speech encoding algorithm. For example, one speech encoder may encode the speech signal in compliance with the G.711 standard, whereas another encoder may operate according to the G.723.1 standard, the G.729 standard, or the SMV standard, etc.

Figure 5:
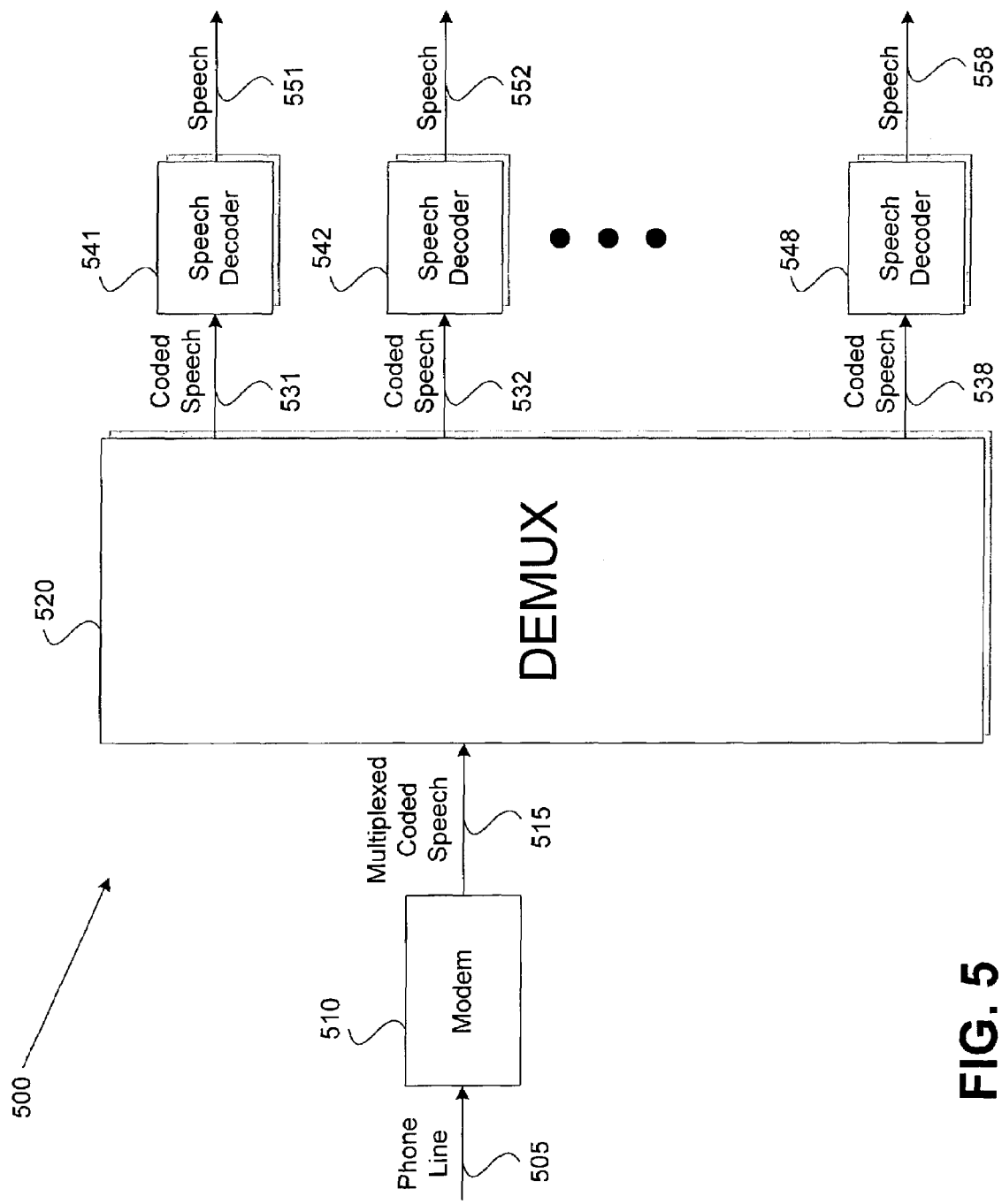
FIG. 5 illustrates a voice reception model according to one embodiment of the present invention for use in conjunction with the voice access model of FIG. 3.

Turning to FIG. 5, it illustrates voice reception model 500 according to one embodiment of the present invention for use in conjunction with voice access model 300 of FIG. 3. It should be noted modem 510 represents each of modems 317, 318 and 319; phone line 505 represents each of phone lines 311, 312 and 313; demultiplexor 520 and speech decoders 541-548 represent each of demultiplexor/codec 321, 322 and 323; and speech lines 551-558 represent each of PSTN lines 326, 327 and 328. According to FIG. 5, exemplary modem 510 is shown to receive, on phone line 505, the data transmitted by exemplary modem 440 on phone line 445. Modem 510 converts the analog signal on phone line 505 to digital data, which is then demodulated by modem 510 to obtain multiplexed coded speech 515. As shown in FIG. 5, demultiplexor 520 demultiplexes multiplexed coded speech 515 and routes coded speeches 531-538 to their respective speech decoders 541-548. Each speech decoder 541-548 decodes or decompresses respective coded speeches 531-538 in accordance with the speech compression algorithm used by respective speech encoders 411 -418. After decoding each of coded speeches 531-538 by respective speech decoder 541-548, speech decoders 541-548 generate audio or analog speeches 551-558, which are provided to users over analog telephone lines 551-558.

In some embodiments communication system 310 may be a single device at a voice gateway or a PBX gateway that can operate in conjunction with a single device at CO 315 over a plurality of analog telephone lines. In one embodiment, one or more phone lines from CO 315 may bypass modems, encoders and multiplexors of communication system 310 and reach the user device to provide a direct connection, which may be used for modem connections, facsimile connections, regular voice connections, etc. In other embodiments, facsimile and modem connections may also be established through encoders, multiplexors and modems of communication system 310.

In a further embodiment of the present invention, communication systems 310 includes a soft switch signaling module, which implements a soft switch signaling protocol, such as SS7 signaling for communication via PSTN lines. SS7 or Signaling System No. 7 is a global standard for telecommunications that defines the procedures and protocol by which network elements in the PSTN exchange information over a digital signaling network to effect wireless and wireline call setup, routing and control.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A communication system configured to receive speech signals via a plurality of speech lines and communicate said speech signals over an analog phone line to a central office, said communication system comprising:
    a modem;
    a multiplexor in data communication with said modem; and
    a plurality of speech codecs in data communication with said multiplexor;
    wherein each of said plurality of speech codecs is configured to receive a portion of said speech signals via one of said plurality of speech lines and encode said portion of said speech signals to generate encoded speech signals, and wherein said multiplexor is configured to multiplex said encoded speech signals from each of said plurality of speech codecs to generate multiplexed encoded speech signals,
    wherein said modem is configured to transmit said multiplexed encoded speech signals over said analog phone line to said central office, and wherein at least one of said plurality of speech codecs is configured to dynamically reduce its coding rate for accommodating at least one additional speech line, over said analog phone line to said central office, using at least one additional speech codec.

2. The communication system of claim 1, wherein said communication system is a single device.

3. The communication system of claim 1 further comprising:
    a second modem;
    a second multiplexor in data communication with said second modem; and
    a plurality of second speech codecs in data communication with said second multiplexor;
    wherein each of said plurality of second speech codecs is configured to receive a portion of said speech signals via one of said plurality of speech lines and encode said portion of said speech signals to generate second encoded speech signals, and wherein said second multiplexor is configured to multiplex said second speech encoded signals from each of said plurality of second speech codecs to generate second multiplexed encoded speech signals,
    wherein said second modem is configured to transmit said second multiplexed encoded speech signals over said analog phone line to said central office, and wherein at least one of said plurality of second speech codecs is configured to dynamically reduce its coding rate for accommodating at least one additional speech line, over said analog phone line to said central office, using at least one additional second speech codec.

4. The communication system of claim 1, wherein at least one of said plurality of speech codecs encodes said speech signals in compliance with SMV standard.

5. The communication system of claim 1, wherein said modem is in compliance with V.90 standard.

6. The communication system of claim 1 further comprising a soft switch signaling module.

7. The communication system of claim 1, wherein said modem modulates said multiplexed encoded speech signals to generate modulated multiplexed encoded speech signals and converts modulated multiplexed encoded speech signals to analog signals prior to transmission over said analog phone line to said central office.

8. A communication system configured to receive modulated multiplexed encoded speech signals via an analog phone line from a central office for communication over a plurality of speech lines, said communication system comprising:
    a modem;
    a demultiplexor in data communication with said modem; and
    a plurality of speech codecs in data communication with said demultiplexor;
    wherein said modem is configured to receive said modulated multiplexed encoded speech signals over said analog phone line from said central office and demodulate said modulated multiplexed encoded speech signals to generate multiplexed encoded speech signals, and wherein said demultiplexor is configured to demultiplex said multiplexed encoded speech signals to generate a plurality of encoded speech signals, and wherein each of said plurality of speech codecs is configured to receive one of said plurality of encoded speech signals and decode said one of said plurality of encoded speech signals to generate a plurality of speech signals for communication over said plurality of speech lines;
    wherein at least one of said plurality of speech codecs is configured to dynamically reduce its coding rate for accommodating at least one additional speech line, over said analog phone line to said central office, using at least one additional speech codec.

9. The communication system of claim 8, wherein said communication system is a single device.

10. The communication system of claim 8 further comprising:
    a second modem;
    a second demultiplexor in data communication with said second modem; and
    a plurality of second speech codecs in data communication with said second multiplexor;
    wherein said second modem is configured to receive said modulated multiplexed encoded speech signals over said analog phone line from said central office and demodulate said modulated multiplexed encoded speech signals to generate second multiplexed encoded speech signals, and wherein said demultiplexor is configured to demultiplex said second multiplexed encoded speech signals to generate a plurality of second encoded speech signals, and wherein each of said plurality of second speech codecs is configured to receive one of said plurality of second encoded speech signals and decode said one of said plurality of second encoded speech signals to generate a plurality of second speech signals for communication over said plurality of speech lines;

wherein at least one of said plurality of second speech codecs is configured to dynamically reduce its coding rate for accommodating at least one additional speech line, over said analog phone line to said central office, using at least one additional second speech codec.

11. The communication system of claim 8, wherein at least one of said plurality of speech codecs encodes said speech signals in compliance with SMV standard.

12. The communication system of claim 8, wherein said modem is in compliance with V.90 standard.

13. The communication system of claim 8 further comprising a soft switch signaling module.

14. A communication method for processing speech signals via a plurality of speech lines and communicating said speech signals over an analog phone line to a central office, the communication method comprising:

receiving said speech signals via said plurality of speech lines;

encoding said speech signals, using a plurality of speech codecs, to generate encoded speech signals;

multiplexing said encoded speech signals received by a multiplexor from said plurality of speech codecs to generate multiplexed encoded speech signals;

modulating said multiplexed encoded speech signals to generate modulated multiplexed encoded speech signals;

converting said modulated multiplexed encoded speech signals to analog signals;

transmitting said analog signals over said analog phone line to said central office;

dynamically reducing a coding rate of at least one of said plurality of speech codecs for accommodating at least one additional speech line, over said analog phone line from said central office, using at least one additional speech codec.

15. The communication method of claim 14, wherein at least one of said plurality of speech codecs encodes said speech signals in compliance with SMV standard.

16. The communication method of claim 14, wherein said modulating is in compliance with V.90 standard.

17. A communication method comprising:

receiving analog signals over an analog phone line from a central office;

converting said analog signals to retrieve modulated multiplexed encoded speech signals from said analog signals;

demodulating said modulated multiplexed encoded speech signals to retrieve multiplexed encoded speech signals;

demultiplexing said multiplexed encoded speech signals by a demultiplexor to retrieve encoded speech signals;

decoding said encoded speech signals, using a plurality of speech codecs, to generate speech signals;

transmitting said speech signals via a plurality of speech lines; and dynamically reducing a coding rate of at least one of said plurality of speech codecs for accommodating at least one additional speech line, over said analog phone line from said central office, using at least one additional speech codec.

18. The communication method of claim 17, wherein at least one of said plurality of speech codecs encodes said speech signals in compliance with SMV standard.

19. The communication method of claim 17, wherein said demodulating is in compliance with V.90 standard.

\* \* \* \* \*